United States Patent
Chakravarty et al.

(10) Patent No.: US 10,810,754 B2
(45) Date of Patent: Oct. 20, 2020

(54) SIMULTANEOUS LOCALIZATION AND MAPPING CONSTRAINTS IN GENERATIVE ADVERSARIAL NETWORKS FOR MONOCULAR DEPTH ESTIMATION

(71) Applicant: Ford Global Technologies, LLC, Dearborn, MI (US)

(72) Inventors: Punarjay Chakravarty, Mountain View, CA (US); Kaushik Balakrishnan, Mountain View, CA (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 226 days.

(21) Appl. No.: 15/961,498

(22) Filed: Apr. 24, 2018

(65) Prior Publication Data

US 2019/0325597 A1 Oct. 24, 2019

(51) Int. Cl.
*G06T 7/593* (2017.01)
*G06T 7/73* (2017.01)
(Continued)

(52) U.S. Cl.
CPC ............ *G06T 7/593* (2017.01); *G06T 7/74* (2017.01); *H04N 13/271* (2018.05);
(Continued)

(58) Field of Classification Search
None
See application file for complete search history.

(56) References Cited

U.S. PATENT DOCUMENTS 9,275,078 B2   3/2016 Bhardwaj
9,674,507 B2   6/2017 Pirchheim
(Continued)

FOREIGN PATENT DOCUMENTS

CN   106780588 A   5/2017
CN   107220600 A   9/2017
(Continued)

OTHER PUBLICATIONS

Godard, Clément, Oisin Mac Aodha, and Gabriel J. Brostow. "Unsupervised monocular depth estimation with left-right consistency." Proceedings of the IEEE Conference on Computer Vision and Pattern Recognition. 2017. (Year: 2017).*
(Continued)

*Primary Examiner* — Vu Le
*Assistant Examiner* — Tracy Mangialaschi
(74) *Attorney, Agent, or Firm* — David R. Stevens; Stevens Law Group

(57) ABSTRACT

The disclosure relates to systems, methods, and devices for determining a depth map of an environment based on a monocular image. A method for determining a depth map includes receiving a plurality of images from a monocular camera forming an image sequence. The method includes determining pose vector data for two successive images of the image sequence and providing the image sequence and the pose vector data to a generative adversarial network (GAN), wherein the GAN is trained using temporal constraints to generate a depth map for each image of the image sequence. The method includes generating a reconstructed image based on a depth map received from the GAN.

20 Claims, 10 Drawing Sheets

(51) Int. Cl.
*H04N 13/271* (2018.01)
*H04N 13/289* (2018.01)
*H04N 13/00* (2018.01)

(52) U.S. Cl.
CPC . *H04N 13/289* (2018.05); *G06T 2207/20081* (2013.01); *G06T 2207/30244* (2013.01); *H04N 2013/0081* (2013.01)

(56) References Cited

U.S. PATENT DOCUMENTS

2017/0337690 A1 11/2017 Arth
2019/0244379 A1* 8/2019 Venkataraman ..... G06N 3/0454

FOREIGN PATENT DOCUMENTS

| CN | 107274445 A | 10/2017 |
| WO | WO-201543872 A1 | 4/2015 |
| WO | WO-2015043872 A1 * | 4/2015 |

OTHER PUBLICATIONS

Kerl, Christian, Jürgen Sturm, and Daniel Cremers. "Robust odometry estimation for RGB-D cameras." 2013 IEEE International Conference on Robotics and Automation. IEEE, 2013. (Year: 2013).*
Zhou, Tinghui, et al. "Unsupervised Learning of Depth and Ego-Motion from Video." 2017 IEEE Conference on Computer Vision and Pattern Recognition (CVPR). IEEE, 2017. (Year: 2017).*

* cited by examiner

SIMULTANEOUS LOCALIZATION AND MAPPING CONSTRAINTS IN GENERATIVE ADVERSARIAL NETWORKS FOR MONOCULAR DEPTH ESTIMATION

TECHNICAL FIELD

The present disclosure relates to methods, systems, and apparatuses for depth perception and more particularly relates to methods, systems, and apparatuses for depth perception using a monocular camera and a generative adversarial network.

BACKGROUND

Depth perception is a requirement for certain autonomous systems, including autonomous driving systems or mobile robotics systems. Depth perception is a key component for carrying out certain tasks such as obstacle avoidance, route planning, mapping, localization, pedestrian detection, and human-robot interaction. Depth perception is traditionally performed by expensive active sensing systems such as LIDAR sensors or passive sensing systems such as binocular vision or stereo cameras.

Depth perception can be integrated in automobiles such as autonomous vehicles and driving assistance systems. Such systems are currently being developed and deployed to provide safety features, reduce an amount of user input required, or even eliminate user involvement entirely. For example, some driving assistance systems, such as crash avoidance systems, may monitor driving, positions, and a velocity of the vehicle and other objects while a human is driving. When the system detects that a crash or impact is imminent the crash avoidance system may intervene and apply a brake, steer the vehicle, or perform other avoidance or safety maneuvers. As another example, autonomous vehicles may drive, navigate, and/or park a vehicle with little or no user input. However, due to the dangers involved in driving and the costs of vehicles, it is extremely important that autonomous vehicles and driving assistance systems operate safely and are able to accurately navigate roads in a variety of different driving environments.

BRIEF DESCRIPTION OF THE DRAWINGS

Non-limiting and non-exhaustive implementations of the present disclosure are described with reference to the following figures, wherein like reference numerals refer to like parts throughout the various views unless otherwise specified. Advantages of the present disclosure will become better understood with regard to the following description and accompanying drawings where.

DETAILED DESCRIPTION

Figure 1:
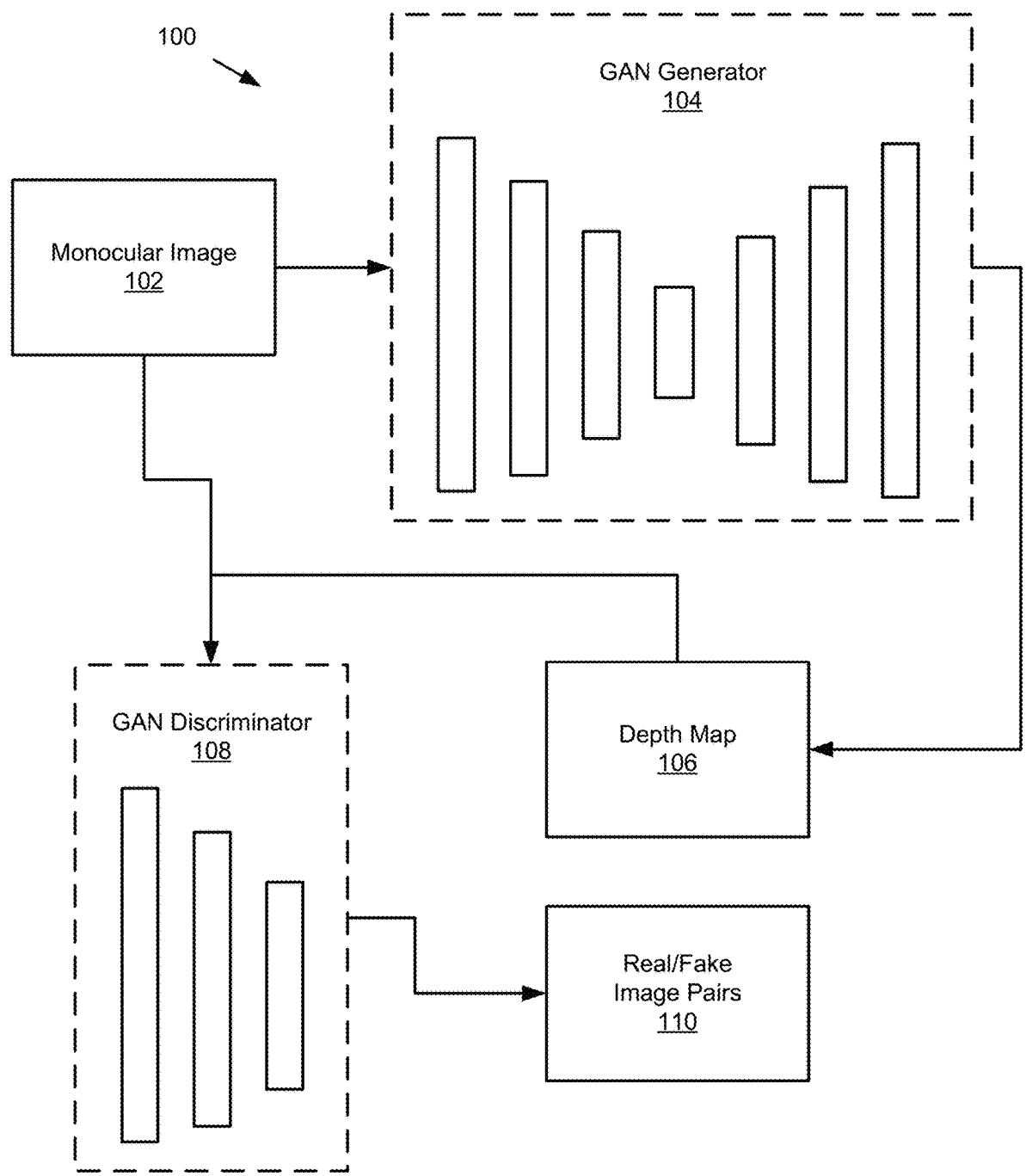
FIG. 1 is a schematic block diagram illustrating an implementation of a process for determining a depth map of an environment, according to one embodiment.

Depth perception of drivable surfaces or regions is an important aspect of allowing for and improving operation of autonomous vehicle or driver assistance features. For example, a vehicle must know precisely where obstacles or drivable surfaces are located to navigate safely around objects. However, estimating depth perception of a drivable surface is challenging when no depth or prior map information is available.

Applicant has developed systems, methods, and devices for depth perception using a monocular camera and a generative adversarial network (GAN). The disclosure pertains to such systems, method, and devices capable of providing depth perception suitable for performing tasks such as obstacle avoidance, path planning, mapping, localization, pedestrian detection, and human-robot interaction. It should be appreciated that depth perception is traditionally performed by expensive active sensing systems including LIDAR sensors or passive sensing systems including binocular vision or stereo cameras. The systems, methods, and devices provided in the disclosure may replace expensive known systems, including those utilizing LIDAR sensors for detecting a depth of an environment. Further, such systems, methods, and devices as disclosed may provide more detailed depth maps compared with those provided by LIDAR systems, may provide a longer range for estimating depth, and may provide quicker estimation of depth maps in real-time.

Additionally, convolutional neural networks have been trained to generate depth maps. In such systems, the convolutional neural network must be trained using massive amounts of single image data and corresponding depth maps. Such systems have struggled to effectively generalize between environments such as indoor versus outdoor environments. Further, the depth maps generated by convolutional neural networks are independent and fail to consider temporal consistency of the data as the camera moves through an environment.

Generative adversarial networks (GANs) have shown that image-to-image transformation, for instance segmentation or labelling tasks, can be achieved with smaller amounts of training data compared to regular convolutional neural networks by training generative networks and discriminative networks in an adversarial manner. Applicant presents systems, methods, and devices for depth estimation of a single image using a GAN. Such systems, methods, and devices improve performance over known depth estimation systems, and further require a smaller number of training images. The use of GAN as opposed to a regular convolutional neural network enables the collection of a small amount of training data in each environment, typically in the hundreds of images as opposed to the hundreds of thousands of images required by convolutional neural networks. Such systems, methods, and devices reduce the burden for data collection by an order of magnitude.

Applicant further presents systems, methods, and devices for depth estimation utilizing visual simultaneous localization and mapping (vSLAM) methods for ensuring temporal consistency in the generated depth maps produced by the GAN as the camera moves through an environment. The vSLAM module provides pose information of the camera, e.g. how much the camera has moved between successive images. Such pose information is provided to the GAN as a temporal constraint on training the GAN to promote the GAN to generate consistent depth maps for successive images.

Before the methods, systems, and devices for determining an object identification hit are disclosed and described, it is to be understood that this disclosure is not limited to the configurations, process steps, and materials disclosed herein as such configurations, process steps, and materials may vary somewhat. It is also to be understood that the terminology employed herein is used for describing implementations only and is not intended to be limiting since the scope of the disclosure will be limited only by the appended claims and equivalents thereof.

In describing and claiming the disclosure, the following terminology will be used in accordance with the definitions set out below.

It must be noted that, as used in this specification and the appended claims, the singular forms "a," "an," and "the" include plural referents unless the context clearly dictates otherwise.

As used herein, the terms "comprising," "including," "containing," "characterized by," and grammatical equivalents thereof are inclusive or open-ended terms that do not exclude additional, unrecited elements or method steps.

In one embodiment, a method for determining depth is disclosed. The method includes receiving a plurality of monocular images forming an image sequence and determining pose vector data for two successive images of the image sequence, wherein the two successive images are captured by a monocular camera in succession. The method includes providing the image sequence and the pose vector data to a GAN, wherein the GAN is trained using temporal constraints to generate a depth map for each image of the image sequence. The method includes generating a reconstructed image based on a depth map received from the GAN.

In one embodiment, a method for training a GAN for depth estimation is disclosed. The method includes receiving a plurality of stereo images forming a stereo image sequence, wherein each image of the stereo image sequence comprises an image pair having a right image and a left image. The method includes calculating stereo pose vector data based on the right image and the left image of the image pair. The method includes receiving a generated depth map from the GAN based on the stereo pose vector data and the left image of the image pair. The method includes calculating a reconstructed right image based on the generated depth map and the left image of the image pair. The method includes calculating a disparity between the right image of the image pair and the reconstructed right image, wherein the disparity provides a temporal constraint for training the GAN.

Further embodiments and examples will be discussed in relation to the figures below.

Referring now to the figures, FIG. 1 illustrates a schematic block diagram of a process 100 of determining a depth map of an environment, according to one embodiment. The process 100 includes receiving a monocular image 102 and feeding the monocular image 102 to a generative adversarial network (hereinafter "GAN") generator 104. The GAN generator 104 generates a depth map 106 based on the monocular image 102. A generative adversarial network ("GAN") discriminator 108 receives the monocular image 102 (i.e. the original image) and the depth map 106 generated by the GAN generator 104. The GAN discriminator 108 is configured to distinguish real and fake image pairs 110, e.g. genuine images received from a camera versus depth map images generated by the GAN generator 104.

In an embodiment, the monocular image 102 is received from a monocular camera and may be received from the monocular camera in real-time. In an embodiment, the monocular camera is attached to a moving device, such as a vehicle, and each monocular image 102 is captured when the monocular camera is in a unique position or is in a unique pose. In an embodiment, the monocular camera is attached to an exterior of a vehicle and provides the monocular image 102 to a vehicle controller, and the vehicle controller is in communication with the GAN generator 104.

The GAN comprises a deep neural network architecture comprising two adversarial nets in a zero-sum game framework. In an embodiment, the GAN comprises a GAN generator 104 configured to generate new data instances and a GAN discriminator 108 configured to evaluate the new data instances for authenticity. In such an embodiment, the GAN discriminator 108 is configured to analyze the new data instances and determine whether each new data instance belongs to the actual training data sets or if it was generated artificially (see 110). The GAN generator 104 is configured to create new images that are passed to the GAN discriminator 108 and the GAN generator 104 is trained to generate images that fool the GAN discriminator 108 into determining that an artificial new data instance belongs to the actual training data.

In an embodiment, the GAN generator 104 receives a monocular image 102 and returns a depth map 106 based on the monocular image 102. The depth map 106 is fed to the GAN discriminator 108 alongside a stream of camera images from an actual dataset, and the GAN discriminator 108 determines a prediction of authenticity for each image, i.e. whether the image is a camera image from the actual dataset or a depth map 106 generated by the GAN generator 104. Thus, in such an embodiment, the GAN generator 104 includes a double feedback loop wherein the GAN discriminator 108 is in a feedback loop with the ground truth of the images and the GAN generator 104 is in a feedback loop with the GAN discriminator 108. In an embodiment, the GAN discriminator 108 is a convolutional neural network configured to categorize images fed to it and the GAN generator 104 is an inverse convolutional neural network. In an embodiment, both the GAN generator 104 and the GAN discriminator 108 are seeking to optimize a different and opposing objective function or loss function. Thus, as the GAN generator 104 changes its behavior, so does the GAN discriminator 108, and vice versa. The losses of the GAN generator 104 and the GAN discriminator 108 push against each other to improve the outputs of the GAN generator 104.

In an embodiment, the GAN generator 104 is pretrained offline before the GAN generator 104 receives a monocular image 102 from a monocular camera. In an embodiment, the GAN discriminator 108 is pretrained before the GAN generator 104 is trained and this may provide a clearer gradient.

In an embodiment, the GAN generator 104 is trained using a known dataset as the initial training data for the GAN discriminator 108. The GAN generator 104 may be seeded with a randomized input that is sampled from a predefined latent space, and thereafter, samples synthesized by the GAN generator 104 are evaluated by the GAN discriminator 108.

In an embodiment, the GAN generator 104 circumvents the bottleneck for information commonly found in an encoder-decoder network known in the art. In such an embodiment, the GAN generator 104 includes skip connections between each layer of the GAN generator 104, wherein each skip connection concatenates all channels of the GAN generator 104. In an embodiment, the GAN generator 104 is optimized by alternating between one gradient descent step on the GAN generator 104 and then one step on the GAN discriminator 108. At interference time, the generator net is run in the same manner as during the training phase. In an embodiment, instance normalization is applied to the GAN generator 104, wherein dropout is applied at test time and batch normalization is applied using statistics of the test batch rather than aggregated statistics of the training batch.

In an embodiment, the GAN generator 104 comprises an encoder-decoder architecture as illustrated in FIG. 1. In such an embodiment, the GAN generator 104 receives the monocular image 102 and generates the depth map 106. The GAN discriminator 108 distinguishes between a pair comprising a monocular image 102 and a depth map 106. The GAN generator 104 and the GAN discriminator 108 are trained alternatively until the GAN discriminator 108 cannot tell the difference between a monocular image 102 and a depth map 106. This can encourage the GAN generator 104 to generate depth maps that are as close to ground truth as possible.

The depth map 106 constitute image-to-image translation that is carried out by the GAN generator 104 and based on the monocular image 102. In generating the depth map 106, the GAN generator 104 learns a mapping from a random noise vector z to determine the depth map 106 output image. The GAN generator 104 generator is trained to produce outputs that cannot be distinguished from real images by an adversarial GAN discriminator 108. In an embodiment, a GAN discriminator 108 learns to classify between a monocular image 102 and a depth map 106, and the GAN generator 104 is trained to fool the GAN discriminator 108. In such an embodiment, both the GAN discriminator 108 and the GAN generator 104 observe the depth map 106 output images.

In an embodiment, the input images, i.e. the monocular image 102 and the output images, i.e. the depth map 106 differ in surface appearance but both include a rendering of the same underlying structure. Thus, structure in the monocular image 102 is roughly aligned with structure in the depth map 106. In an embodiment, the GAN generator 104 architecture is designed around this consideration.

Figure 2:
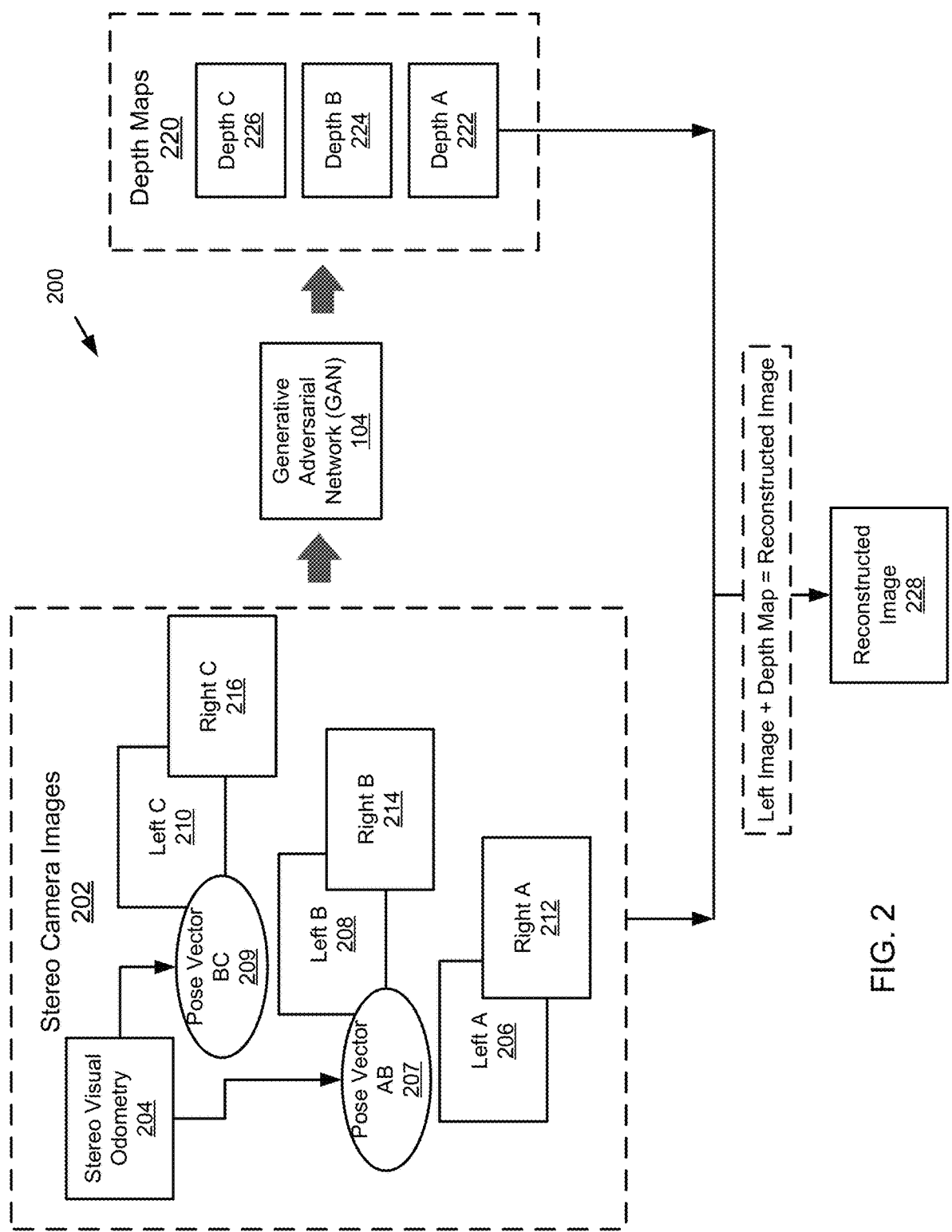
FIG. 2 is a schematic block diagram illustrating an implementation of a process for determining a depth map of an environment, according to one embodiment.

FIG. 2 illustrates a schematic block diagram of a process 200 for training a GAN (generative adversarial network) generator 104 for depth perception. The system 200 includes stereo camera images 202 and depth maps 220 generated by the GAN generator 104 that are based on the stereo camera images 202. The stereo camera images 202 are processed via stereo visual odometry 204 (stereo VO) in one embodiment to generate stereo pose vectors 207, 209. The stereo camera images 202 include stereo camera images, wherein each stereo camera image comprises an image pair having a right image 212, 214, 216 and a left image 206, 208, 210. The stereo camera images 202 are such that an image pair A comprises left image A 206 and right image A 212; an image pair B comprises left image B 208 and right image B 214; and an image pair C comprises left image C 210 and right image C 216. The images, including image pair A 206, 212, image pair B 208, 214, and image pair C 210, 216 form a stereo image sequence wherein each pair of images are captured by stereo cameras in sequence as the stereo cameras move through an environment. The system includes depth maps 220 corresponding to the stereo camera images 202. In the embodiment as illustrated, depth map A 222 is generated based on image pair A 206, 212; depth map B 224 is generated based on image pair B 208, 214; and depth map C 226 is generated based on image pair C 210, 216. The process 200 includes determining a reconstructed image 228 based on the addition of a left image 206, 208, 210 of a stereo image pair and a depth map 222, 224, 226.

The process of stereo visual odometry 204 is implemented to determine a stereo pose vector (see 207, 209) between successive pairs of stereo camera images 202. The process of stereo visual odometry 204 is used to calculate a stereo pose vector based on successive units of the original left-right image pairs (from the stereo camera images 202). The process of stereo visual odometry 204 is further used to calculate a reconstructed stereo pose vector based on successive units of a pair comprising the original left image (see 206, 208, 210) and the reconstructed right image (see FIG. 3 at 302, 304, 306).

The stereo pose vectors 207, 209 are calculated by way of stereo visual odometry 204. The stereo pose vectors 207, 209 indicate estimated relative poses of a stereo camera when a left-right image pair was captured. A stereo pose vector is calculated based on successive units of left-right image pairs, wherein the successive units are captured in succession by a stereo camera as the stereo camera moves through an environment. For example, stereo pose vector AB 207 is calculated based on successive units of image pairs including image pair A 206, 212 and image pair B 208, 214. Further, stereo pose vector BC 209 is calculated based on successive units of image pairs including image pair B 208, 214 and image pair C 210, 216. In an embodiment, the stereo pose vector 207, 209 comprises six Degree of Freedom (6 DoF) pose information indicating relative poses of the camera when each image was captured. In an embodiment, the six Degree of Freedom pose information is obtained using visual simultaneous localization and mapping.

Stereo visual odometry 204 is the process of determining the position and orientation of a camera by analyzing the associated camera images. It should be appreciated by one of skill in the art that stereo visual odometry 204 has been used in robotic applications to determine an orientation of a robot in an environment. In an embodiment, stereo visual odometry 204 is used in the training phase of the GAN generator 104 to determine stereo pose vectors based on successive units of left-right stereo image pairs. Stereo visual odometry 204 is further used in the training phase to determine reconstructed stereo pose vectors based on successive units of an image pair comprising an original left image and a reconstructed right image. In an embodiment, the disparity between a stereo pose vector and a reconstructed stereo pose vector provides a loss signal that can be used as a temporal constraint to train the GAN generator 104 to later generate a depth map 106 based on a monocular image 102.

The reconstructed image 228 is generated by rearranging the fundamental formula in a stereo algorithm. As such, the horizontal disparity, i.e. the different in pixel location or the 2D projection of a 3D point between the left and right images for a point in 3D space is inversely proportional to the actual distance to that object in 3D space. That is, the closer an object is, the greater the disparity. This relationship is represented by Formula 1, below, where Z is equal to the distance along the camera Z axis, f is equal to the focal length in pixels, B is equal to the baseline in meters, and d is equal to the disparity in pixels.

$$Z = fB \div d \quad \text{Formula 1}$$

Further regarding Formula 1, a depth map 222, 224, 226 is received from the GAN generator 104 that pertains to a left image 206, 208, 210 of the stereo camera images 202. The distance along the camera Z axis (see variable Z) is read for all pixels in the image directly off the depth map 222, 224, 226. Knowing the baseline or inter-camera distance in the stereo pair (see variable B) and the focal length of the camera (see variable f), the disparity for each pixel in the left image (see variable d) can be calculated. The disparity indicates how much each pixel must be shifted along each scan-line in the left image to the right image to recreate the right image as a reconstructed image 228. Thus, given a depth map for a left image (see 222, 224, 226), and the left image itself (see 206, 208, 210), the right image of a stereo image pair may be recreated to produce the reconstructed image 228.

Figure 3:
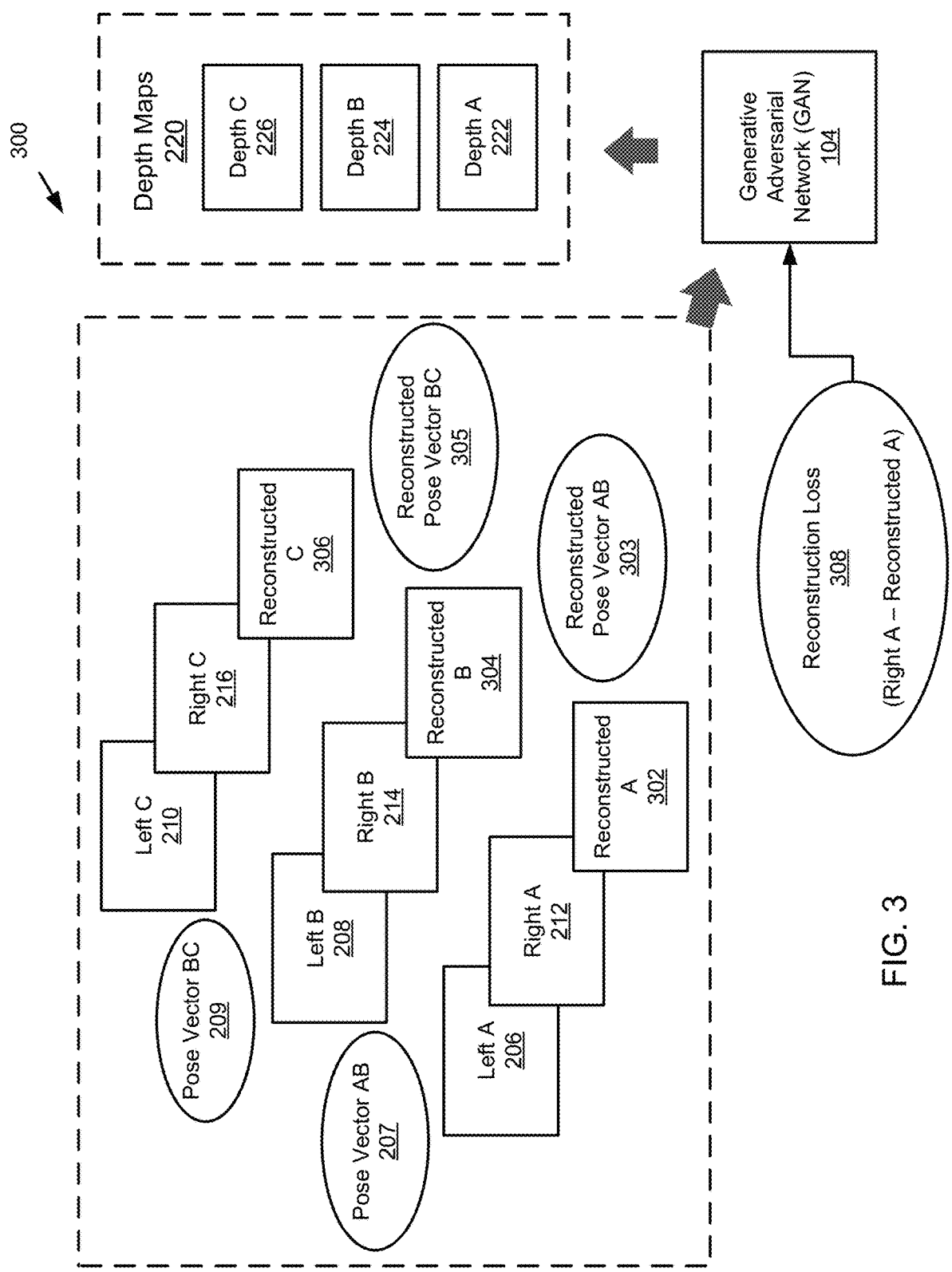
FIG. 3 is a schematic block diagram illustrating an implementation of a process for determining a depth map of an environment, according to one embodiment.

FIG. 3 illustrates schematic block diagram of a process 300 as in FIG. 2 that further includes the generation of a reconstruction loss 308 and reconstructed stereo pose vectors. The reconstructed right images 302, 304, 306 illustrated in FIG. 3 are determined by the process illustrated in FIG. 2 for generating a reconstructed image 228. Specifically, reconstructed right image A 302 is determined based on left image A 206 and depth map A 222; reconstructed right image B 304 is determined based on left image B 208 and depth map B 224; and reconstructed right image C 306 is determined based on left image C 210 and depth map C 226. In an embodiment, a plurality of reconstructed right images 302, 304, 306 is determined based on a plurality of left images and depth maps 220. A reconstruction loss 308 is calculated based on an original left image of a left-right stereo image pair, and on a reconstructed right image. The reconstruction loss 308 is provided to the GAN generator 104 as a temporal constraint during the training phase of the GAN to improve the GAN generator's 104 generation of depth maps 220. In an embodiment, a reconstructed stereo pose vector 303, 305 is generated based on successive units of an image pair comprising a left image 206, 208, 210 and a reconstructed right image 302, 304, 306. Specifically, reconstructed stereo pose vector AB 303 is determined based on left image A 206, reconstructed image A 302, left image B 208, and reconstructed image B 304; and reconstructed stereo pose vector BC 304 is determined based on left image B 208, reconstructed image B 304, left image C 210, and reconstructed image C 306.

The reconstructed stereo pose vectors 303, 305 are calculated by way of stereo visual odometry 204. A disparity between a stereo pose vector and a reconstructed stereo pose vector may be calculated and provided to the GAN generator 104 as an additional temporal constraint for training the GAN generator 104 in producing depth maps 220. Specifically, a disparity between stereo pose vector AB 207 and reconstructed stereo pose vector AB 303 may be determined, and an additional disparity between stereo pose vector BC 209 and reconstructed stereo pose vector BC 305 can be determined.

In an embodiment, the stereo image pairs (see stereo camera images 202) are only used during the training phase of the GAN generator 104. During testing or deployment phases of the GAN generator 104, the trained GAN generator 104 reads the left image of a stereo image pair, or a monocular image received from a monocular camera, and the GAN generator 104 generates a depth map 220 based on the left image or the monocular image and the temporal constraints provided to the GAN generator 104 during the training phase.

Figure 4:
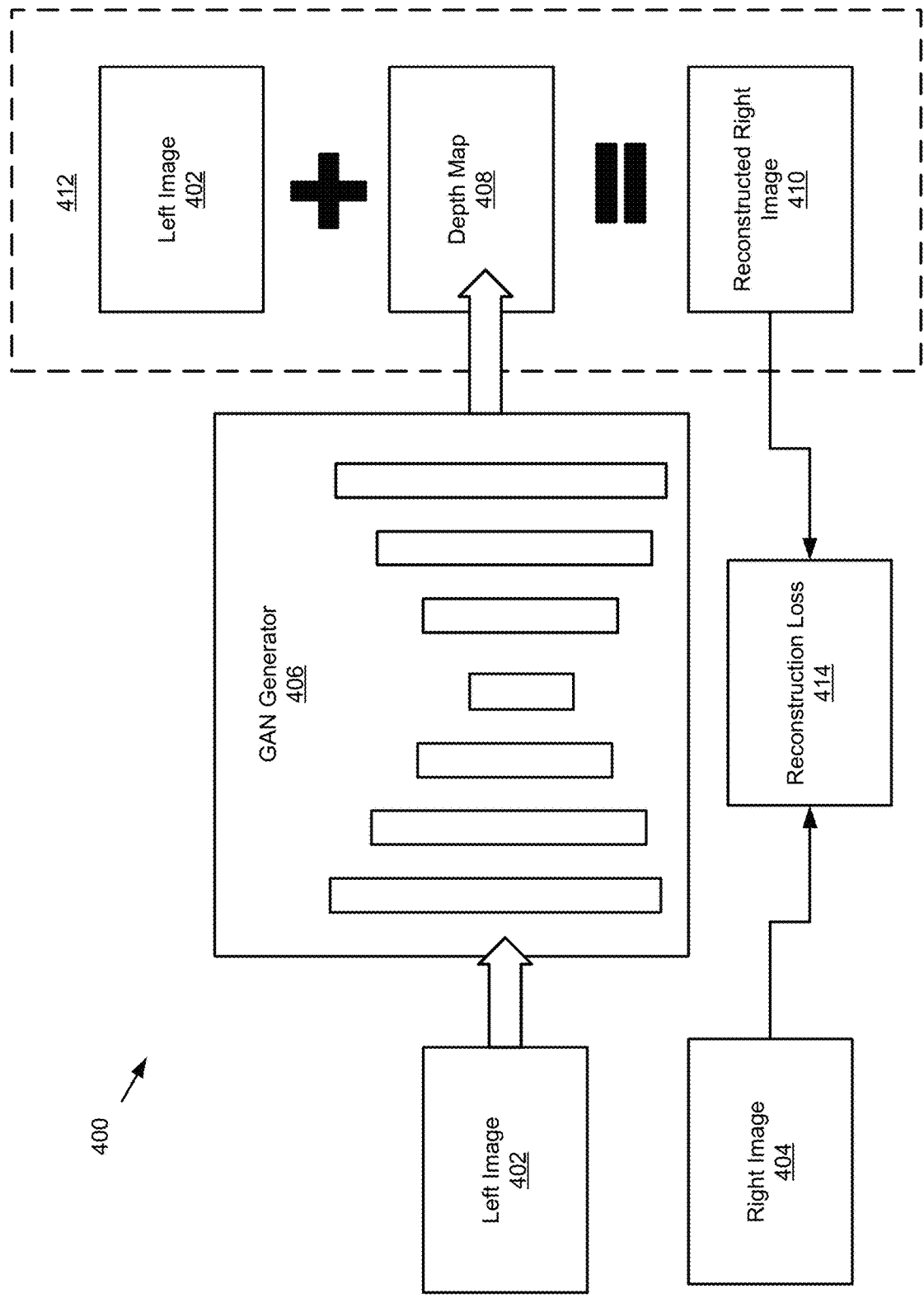
FIG. 4 is a schematic block diagram illustrating an implementation of a process for determining a loss signal, according to one embodiment.

FIG. 4 illustrates a schematic block diagram of a process 400 for calculating a reconstruction loss 414. The process 400 is configured to be implemented during a training phase of the GAN generator 104. The process 400 includes providing a left image 402 of a left-right stereo image pair (including left image 402 and right image 404) to a GAN generator 406. The GAN generator 406 outputs a depth map 408. The left image 402 is added to the depth map 408 to output a reconstructed right image 410. A disparity is calculated between the right image 404 and the reconstructed right image 410 to determine the reconstruction loss 414. In an embodiment, the reconstruction loss 414 is provided to the GAN generator 104 as a loss signal or temporal constraint during the training phase of the GAN.

Figure 5:
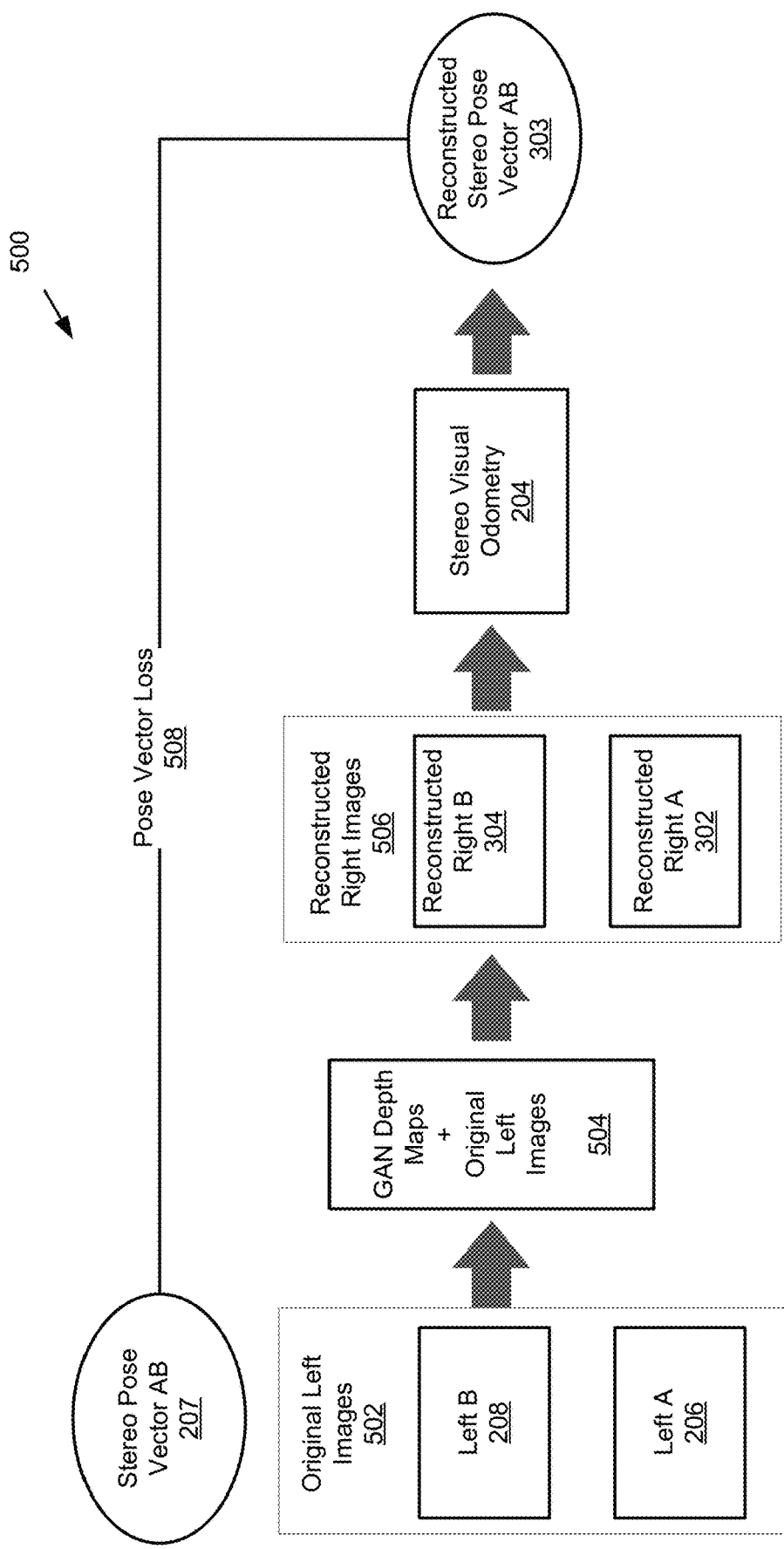
FIG. 5 is a schematic block diagram illustrating an implementation of a process for determining a depth map of an environment, according to one embodiment.

FIG. 5 illustrates a process 500 for calculating a pose vector loss 508. In an embodiment the process 500 is implemented during a training phase of the GAN generator 104. The process 500 includes providing original left images 502 (of left-right stereo image pairs) to a GAN generator 104. The GAN generator 104 outputs depth maps 220 corresponding to the original left images 502. An original left image 502 is added to a corresponding depth map 220 at process step 504 to output a reconstructed right image 506. The process of stereo visual odometry 204 is used to determine stereo pose vector AB 207 and reconstructed stereo pose vector AB 303. The pose vector loss 508 is equal to the disparity between the stereo pose vector AB 207 and the reconstructed stereo pose vector AB 303. The pose vector loss 508 serves as a loss signal or temporal constraint that is provided to the GAN generator 104 during the training phase of the GAN generator 104.

Figure 6:
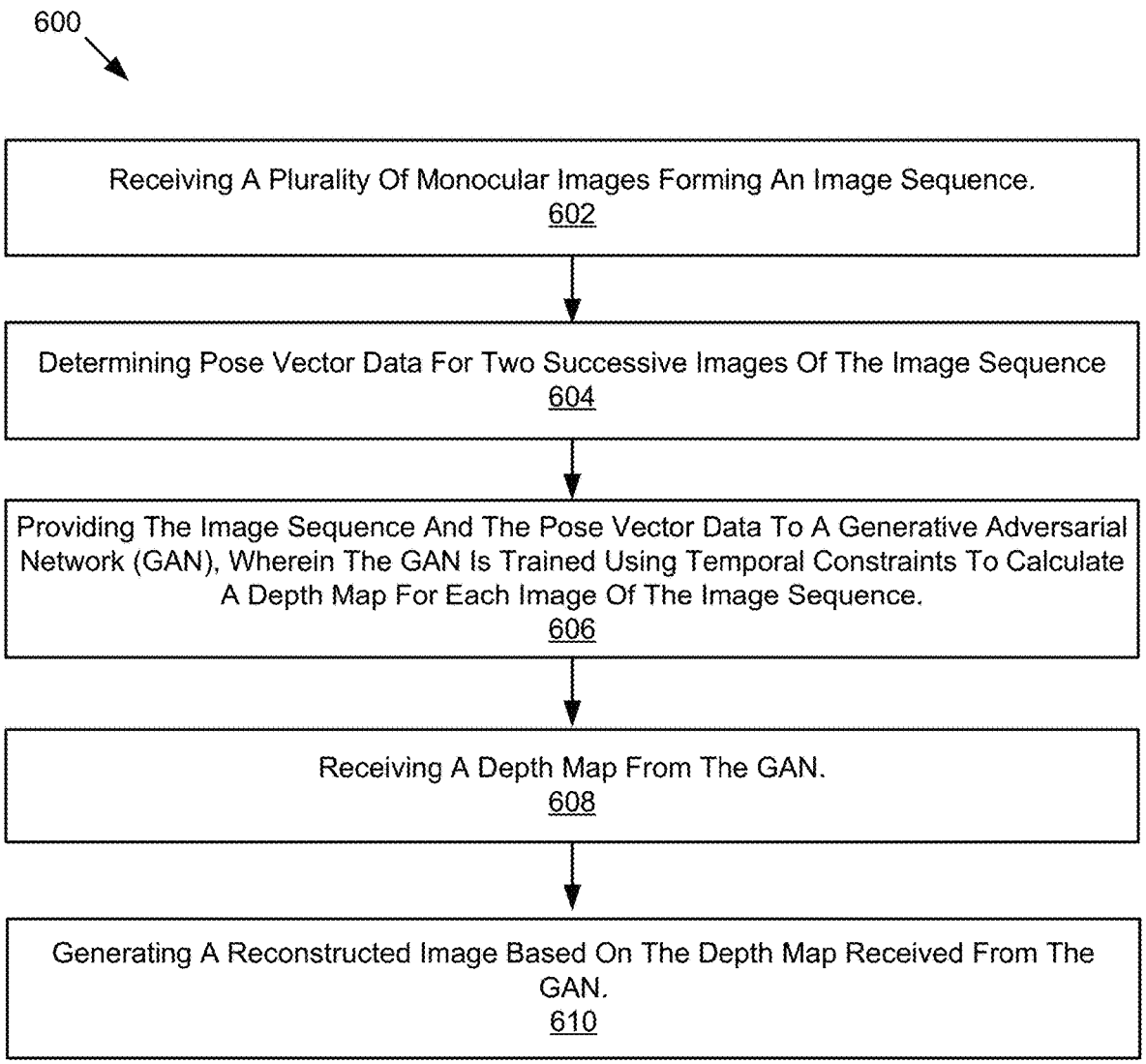
FIG. 6 is a schematic block diagram illustrating a method for determining a depth of an environment, according to one embodiment.

FIG. 6 illustrates a schematic flow chart diagram of a method 600 of determining a depth of an environment using a monocular camera. The method 600 begins and a computing device, such as a vehicle controller system (see 900) or any other suitable computing device, receives a plurality of monocular images forming an image sequence at 602. The computing device determines pose vector data for two successive images of the image sequence at 604 and may determine the pose vector data based on visual simultaneous localization and mapping methods. The computing device provides the image sequence and the pose vector data to a generative adversarial network (GAN), wherein the GAN is trained using temporal constraints to calculate a depth map for each image of the image sequence at 606. The computing device receives a depth map from the GAN at 608 and generates a reconstructed image based on the depth map received from the GAN at 610.

Figure 7:
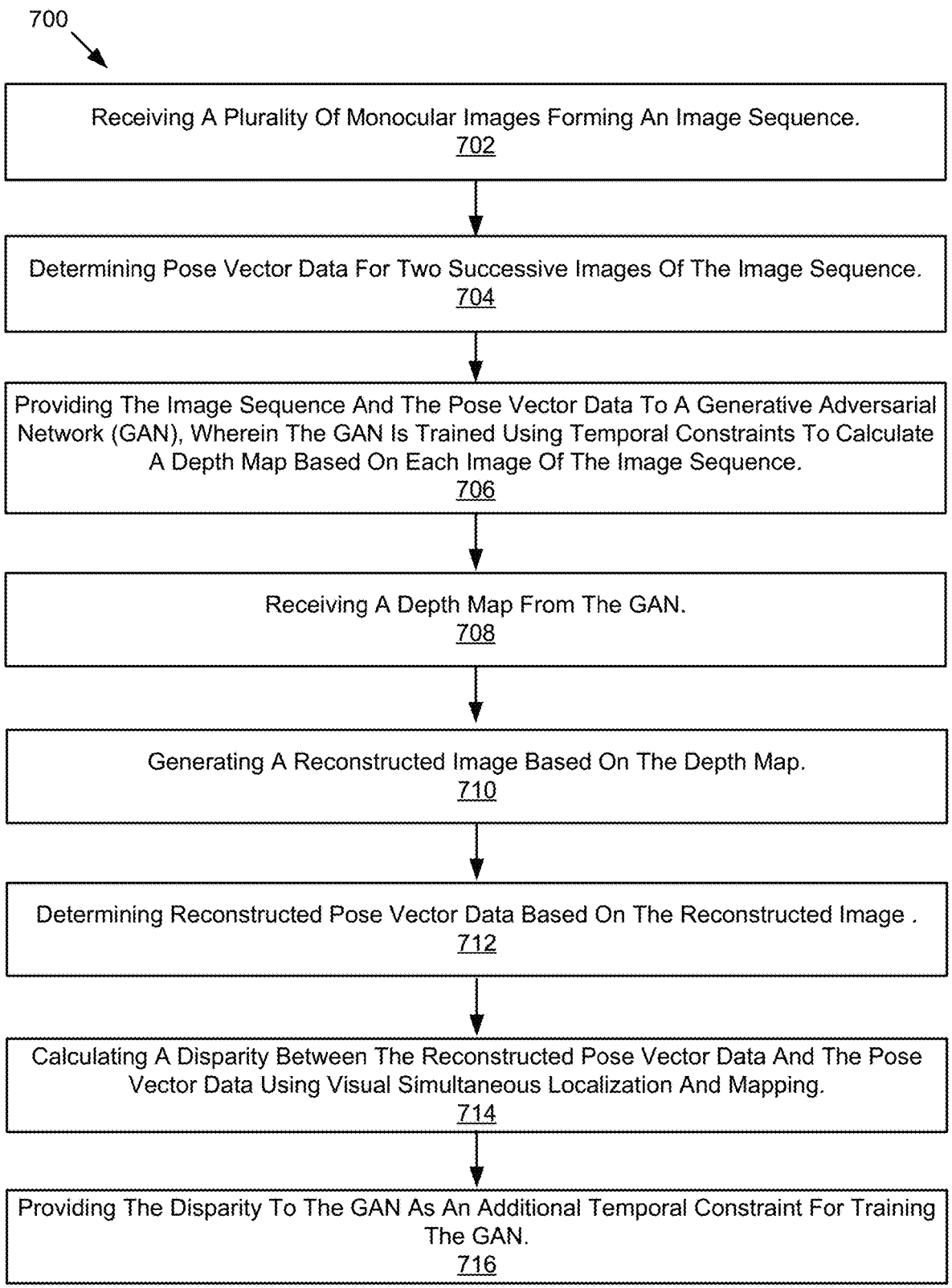
FIG. 7 is a schematic block diagram illustrating a method for determining a depth of an environment, according to one embodiment.

FIG. 7 illustrates a schematic flow chart diagram of a method 700 for determining a depth of an environment. The method 700 begins and a computing device, such as a vehicle controller system (see 900) or any other suitable computing device, receives a plurality of monocular images forming an image sequence at 702. The computing device determines pose vector data for two successive images of the image sequence at 704. The computing device provides the image sequence and the pose vector data to a generative adversarial network (GAN), wherein the GAN is trained using temporal constraints to calculate a depth map based on each image of the image sequence at 706. The computing device receives a depth map from the GAN at 708 and generates a reconstructed image based on the depth map at 710. The computing device determines reconstructed pose vector data based on the reconstructed image at 712. The computing device calculates a disparity between the reconstructed pose vector data and the pose vector data using visual simultaneous localization and mapping at 714. The computing device provides the disparity to the GAN as an additional temporal constraint for training the GAN at 716.

Figure 8:
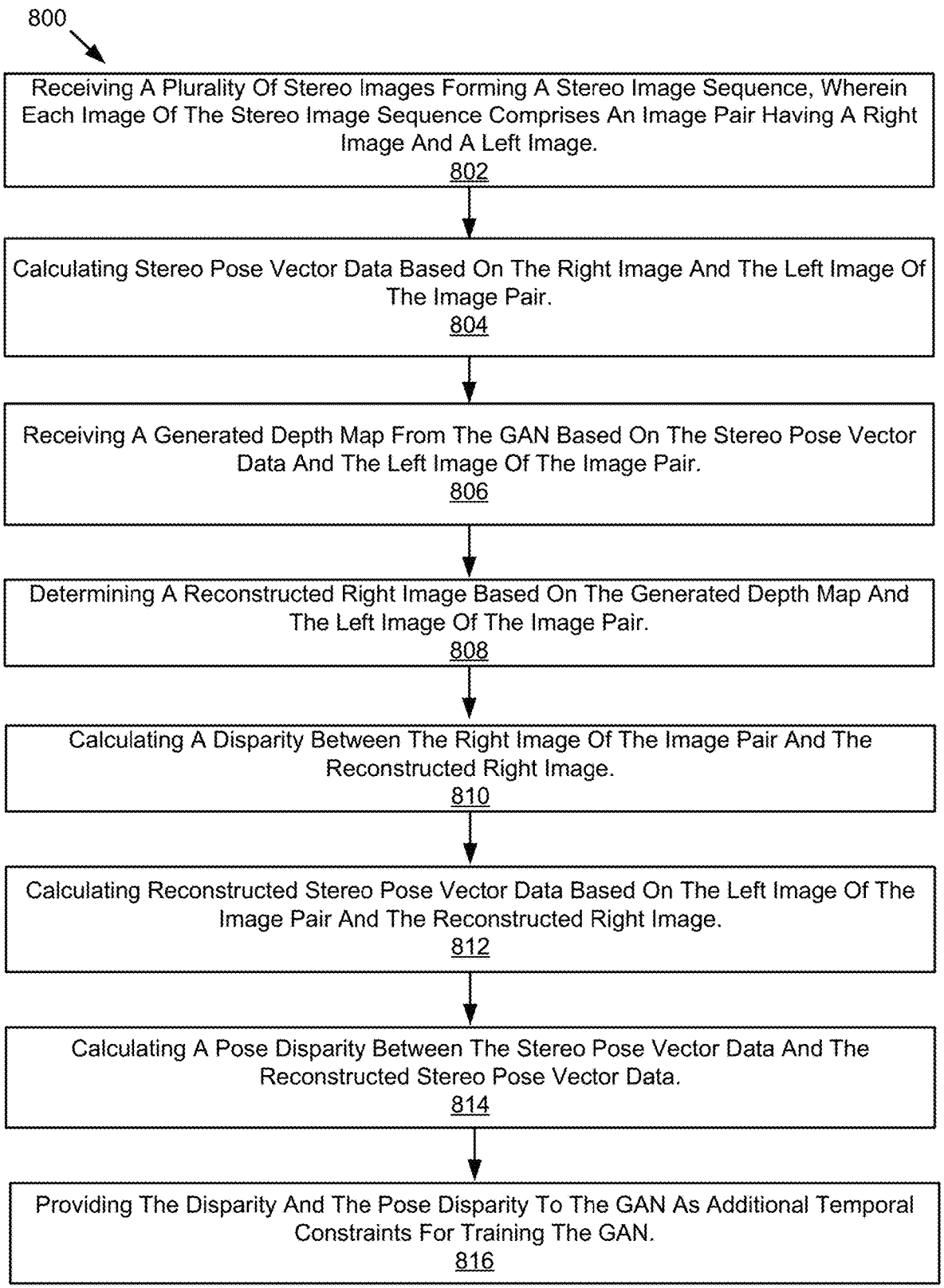
FIG. 8 is a schematic block diagram illustrating a method for determining a depth of an environment, according to one embodiment.

FIG. 8 illustrates a schematic flow chart diagram of a method 800 for training a GAN for determining a depth of an environment. The method 800 begins and a computing device, such as a vehicle controller system (see 900) or any other suitable computing device, receives a plurality of stereo images forming a stereo image sequence, wherein each image of the stereo image sequence comprises an image pair having a right image and a left image at 802. The computing device calculates stereo pose vector data based on the right image and the left image of the image pair 804. The computing device receives a generated depth map from the GAN based on the stereo pose vector data and the left image of the image pair at 806. The computing device determines a reconstructed right image based on the generated depth map and the left image of the image pair at 808. The computing device calculates a disparity between the right image of the image pair and the reconstructed right image at 810. The computing device calculates reconstructed stereo pose vector data based on the left image of the image pair and the reconstructed right image at 812. The computing device calculates a pose disparity between the stereo pose vector data and the reconstructed stereo pose vector data at 814. The computing device provides the disparity and the pose disparity to the GAN as additional temporal constraints for training the GAN at 816.

Figure 9:
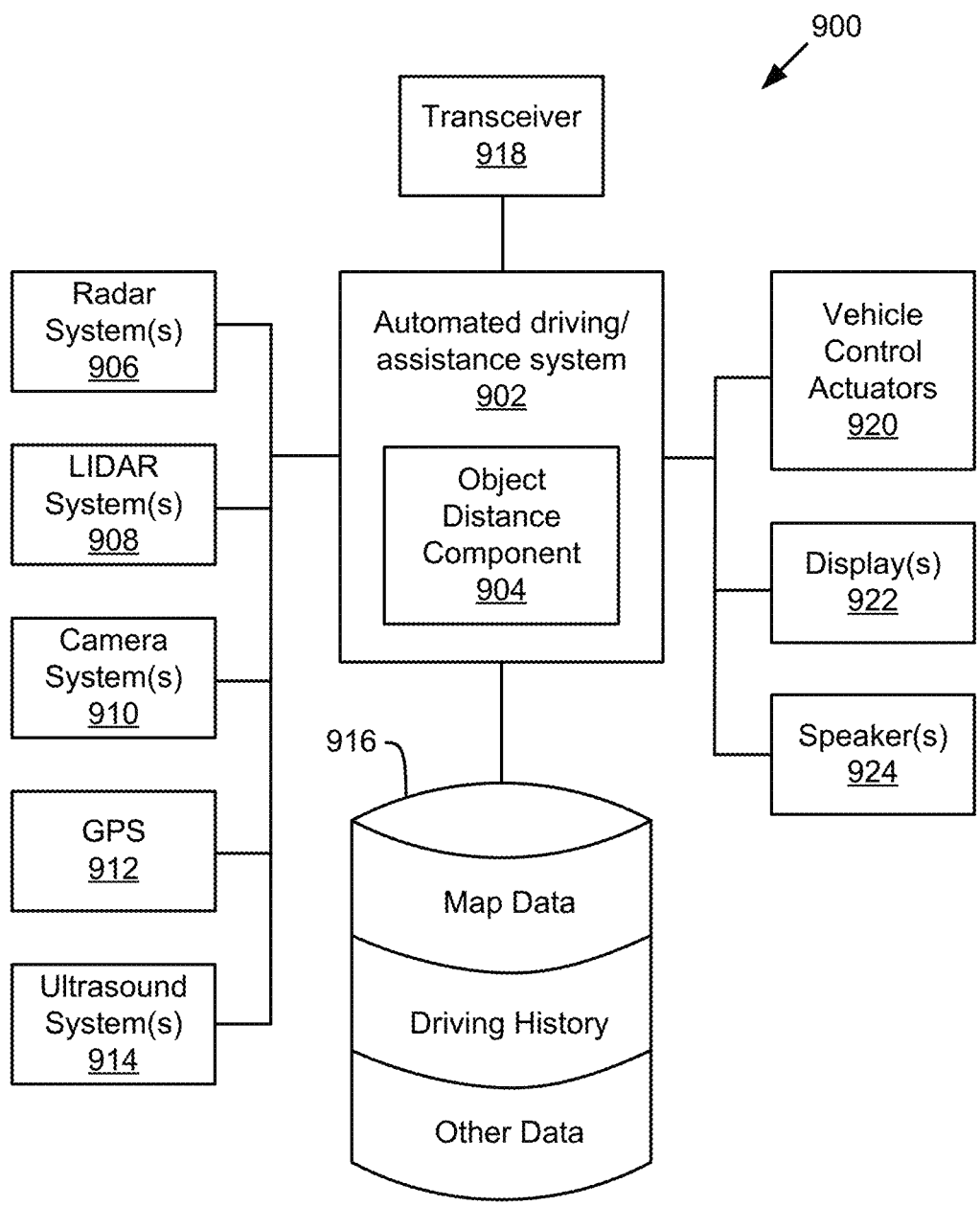
FIG. 9 is a schematic block diagram illustrating an example vehicle control system or autonomous vehicle system, according to one embodiment.

FIG. 9 illustrates an example vehicle control system 900 that may be used for autonomous or assisted driving. The automated driving/assistance system 902 may be used to automate or control operation of a vehicle or to aid a human driver. For example, the automated driving/assistance system 902 may control one or more of braking, steering, acceleration, lights, alerts, driver notifications, radio, or any other auxiliary systems of the vehicle. In another example, the automated driving/assistance system 902 may not be able to provide any control of the driving (e.g., steering, acceleration, or braking), but may provide notifications and alerts to assist a human driver in driving safely. The automated driving/assistance system 902 may use a neural network, or other model or algorithm to detect or localize objects based on perception data gathered by one or more sensors.

The vehicle control system 900 also includes one or more sensor systems/devices for detecting a presence of objects near or within a sensor range of a parent vehicle (e.g., a vehicle that includes the vehicle control system 900). For example, the vehicle control system 900 may include one or more radar systems 906, one or more LIDAR systems 908, one or more camera systems 910, a global positioning system (GPS) 912, and/or one or more ultrasound systems 914. The vehicle control system 900 may include a data store 916 for storing relevant or useful data for navigation and safety such as map data, driving history or other data. The vehicle control system 900 may also include a transceiver 918 for wireless communication with a mobile or wireless network, other vehicles, infrastructure, or any other communication system.

The vehicle control system 900 may include vehicle control actuators 920 to control various aspects of the driving of the vehicle such as electric motors, switches or other actuators, to control braking, acceleration, steering or the like. The vehicle control system 900 may also include one or more displays 922, speakers 924, or other devices so that notifications to a human driver or passenger may be provided. A display 922 may include a heads-up display, dashboard display or indicator, a display screen, or any other visual indicator which may be seen by a driver or passenger of a vehicle. A heads-up display may be used to provide notifications or indicate locations of detected objects or overlay instructions or driving maneuvers for assisting a driver. The speakers 924 may include one or more speakers of a sound system of a vehicle or may include a speaker dedicated to driver notification.

It will be appreciated that the embodiment of FIG. 9 is given by way of example only. Other embodiments may include fewer or additional components without departing from the scope of the disclosure. Additionally, illustrated components may be combined or included within other components without limitation.

In one embodiment, the automated driving/assistance system 902 is configured to control driving or navigation of a parent vehicle. For example, the automated driving/assistance system 902 may control the vehicle control actuators 920 to drive a path on a road, parking lot, driveway or other location. For example, the automated driving/assistance system 902 may determine a path based on information or perception data provided by any of the components 906-918. The sensor systems/devices 906-910 and 914 may be used to obtain real-time sensor data so that the automated driving/ assistance system 902 can assist a driver or drive a vehicle in real-time.

Figure 10:
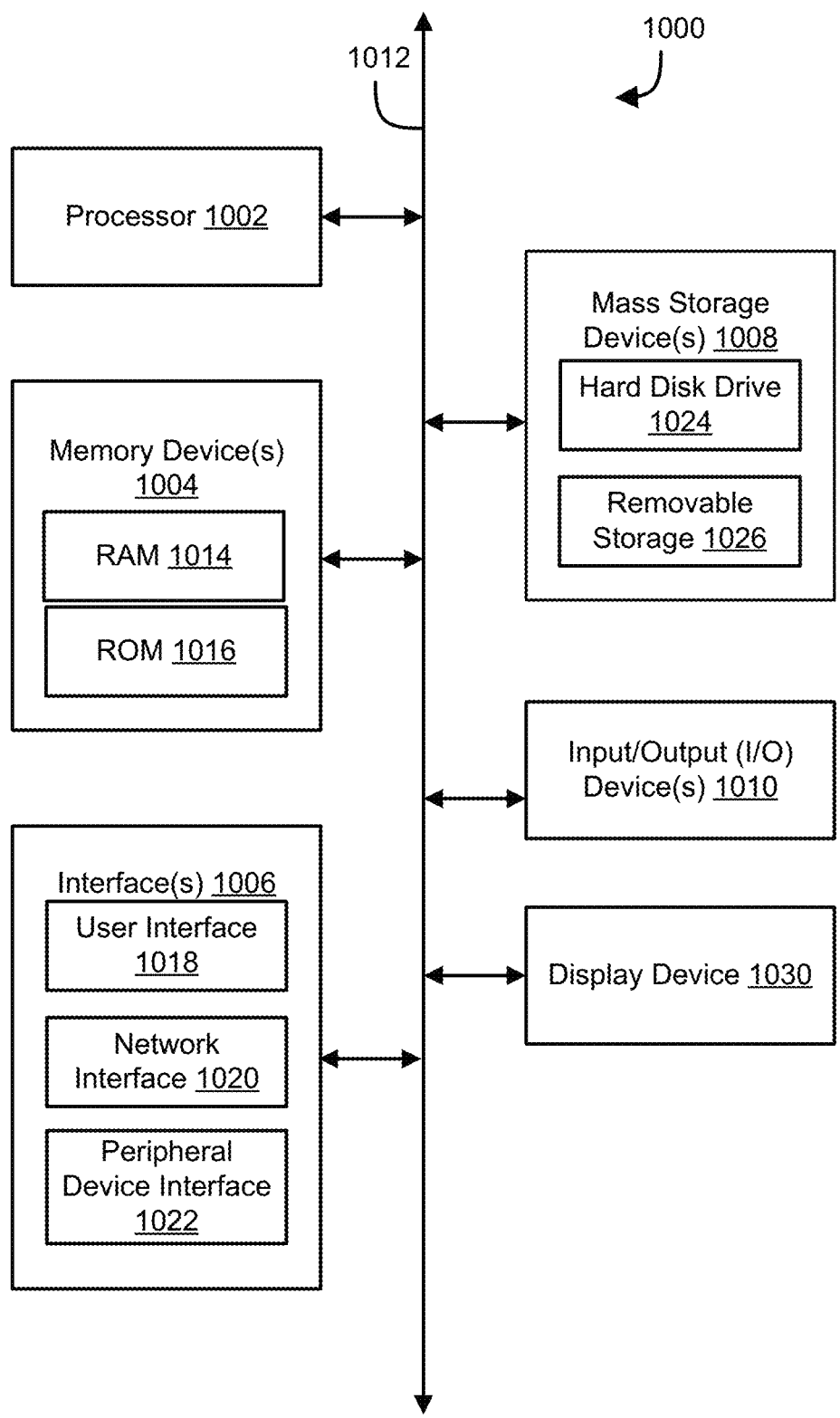
FIG. 10 is a schematic block diagram illustrating an example computing system, according to one embodiment.

Referring now to FIG. 10, a block diagram of an example computing device 1000 is illustrated. Computing device 1000 may be used to perform various procedures, such as those discussed herein. In one embodiment, the computing device 1000 can function as a neural network such as a GAN generator 104, a vehicle controller, a server, and the like. Computing device 1000 can perform various monitoring functions as discussed herein, and can execute one or more application programs, such as the application programs or functionality described herein. Computing device 1000 can be any of a wide variety of computing devices, such as a desktop computer, in-dash computer, vehicle control system, a notebook computer, a server computer, a handheld computer, tablet computer and the like.

Computing device 1000 includes one or more processor(s) 1002, one or more memory device(s) 904, one or more interface(s) 1006, one or more mass storage device(s) 1008, one or more Input/output (I/O) device(s) 1010, and a display device 1030 all of which are coupled to a bus 1012. Processor(s) 1002 include one or more processors or controllers that execute instructions stored in memory device(s) 1004 and/or mass storage device(s) 1008. Processor(s) 1002 may also include various types of computer-readable media, such as cache memory.

Memory device(s) 1004 include various computer-readable media, such as volatile memory (e.g., random access memory (RAM) 1014) and/or nonvolatile memory (e.g., read-only memory (ROM) 1016). Memory device(s) 1004 may also include rewritable ROM, such as Flash memory.

Mass storage device(s) 1008 include various computer readable media, such as magnetic tapes, magnetic disks, optical disks, solid-state memory (e.g., Flash memory), and so forth. As shown in FIG. 9, a particular mass storage device is a hard disk drive 1024. Various drives may also be included in mass storage device(s) 1008 to enable reading from and/or writing to the various computer readable media. Mass storage device(s) 1008 include removable media 1026 and/or non-removable media.

I/O device(s) 1010 include various devices that allow data and/or other information to be input to or retrieved from computing device 1000. Example I/O device(s) 1010 include cursor control devices, keyboards, keypads, microphones, monitors or other display devices, speakers, printers, network interface cards, modems, and the like.

Display device 1030 includes any type of device capable of displaying information to one or more users of computing device 1000. Examples of display device 1030 include a monitor, display terminal, video projection device, and the like.

Interface(s) 1006 include various interfaces that allow computing device 1000 to interact with other systems, devices, or computing environments. Example interface(s) 1006 may include any number of different network interfaces 1020, such as interfaces to local area networks (LANs), wide area networks (WANs), wireless networks, and the Internet. Other interface(s) include user interface 1018 and peripheral device interface 1022. The interface(s) 1006 may also include one or more user interface elements 1018. The interface(s) 1006 may also include one or more peripheral interfaces such as interfaces for printers, pointing devices (mice, track pad, or any suitable user interface now known to those of ordinary skill in the field, or later discovered), keyboards, and the like.

Bus 1012 allows processor(s) 1002, memory device(s) 1004, interface(s) 1006, mass storage device(s) 1008, and I/O device(s) 1010 to communicate with one another, as well as other devices or components coupled to bus 1012. Bus 1012 represents one or more of several types of bus structures, such as a system bus, PCI bus, IEEE bus, USB bus, and so forth.

For purposes of illustration, programs and other executable program components are shown herein as discrete blocks, although it is understood that such programs and components may reside at various times in different storage components of computing device 1000 and are executed by processor(s) 1002. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

EXAMPLES

The following examples pertain to further embodiments.

Example 1 is a method. The method includes: receiving a plurality of images forming an image sequence; determining pose vector data for two successive images of the image sequence; providing the image sequence and the pose vector data to a generative adversarial network (GAN), wherein the GAN is trained using temporal constraints to generate a depth map for each image of the image sequence; and generating a reconstructed image based on a depth map received from the GAN.

Example 2 is a method as in Example 1, wherein each image of the plurality of images is a monocular image, and wherein the reconstructed image is a monocular image.

Example 3 is a method as in any of Examples 1-2, wherein the plurality of images is received from a monocular camera, and wherein determining the pose vector data comprises using visual simultaneous localization and mapping for incrementally calculating a map of an environment of the monocular camera.

Example 4 is a method as in any of Examples 1-3, wherein the monocular camera is attached to a moving apparatus and wherein each image of the plurality of images is captured at a unique position of the monocular camera.

Example 5 is a method as in any of Examples 1-4, further comprising calculating a loss signal configured to provide an additional temporal constraint for training the GAN. Calculating the loss signal comprises: receiving two successive depth maps from the GAN corresponding to the two successive images of the image sequence; determining depth pose vector data for the two successive depth maps using visual simultaneous localization and mapping; and calculating a disparity between the depth pose vector data and the pose vector data, wherein the disparity provides the loss signal.

Example 6 is a method as in Example 5, further comprising providing the loss signal to the GAN to provide a geometric pose constraint for use by the GAN to promote consistency by the GAN in generating the depth map.

Example 7 is a method as in any of Examples 1-6, further comprising determining a temporal constraint for training the GAN. Determining the temporal constraint comprises: receiving a plurality of stereo images forming a stereo image sequence, wherein each image of the stereo image sequence comprises an image pair having a right image and a left image; calculating stereo pose vector data based on the right image and the left image of the image pair; receiving a generated depth map from the GAN based on the stereo pose vector data and the left image of the image pair; calculating a reconstructed right image based on the generated depth map and the left image of the image pair; and calculating a disparity between the right image of the image pair and the reconstructed right image, wherein the disparity provides the temporal constraint for training the GAN.

Example 8 is a method as in Example 7, further comprising determining an additional temporal constraint for training the GAN. Determining the additional temporal constraint comprises: determining reconstructed stereo pose vector data based on the left image of the image pair and the reconstructed right image; and calculating a pose disparity between the pose vector data and the reconstructed stereo pose vector data, wherein the pose disparity provides the additional temporal constraint for training the GAN.

Example 9 is a method as in any of Examples 1-8, wherein the stereo pose vector data and the reconstructed stereo pose vector data are calculated using stereo visual odometry.

Example 10 is a method as in any of Examples 1-9, wherein the image sequence comprises six images and the pose vector data comprises six Degree of Freedom pose information for each image of the six images, wherein the six Degree of Freedom pose information indicates relative poses of a monocular camera when each image was captured.

Example 11 is a method as in any of Examples 1-10, wherein the GAN is configured to generate a single depth map based on a single image at a time, and wherein the temporal constraints are derived using stereo visual odometry and train the GAN to enforce temporal continuity in the quality of a plurality of depth maps generated by the GAN.

Example 12 is a method as in any of Examples 1-11, wherein the plurality of images is received from a monocular camera attached to a vehicle, and wherein the GAN is in communication with a vehicle controller.

Example 13 is non-transitory computer-readable storage media storing instructions that, when executed by one or more processors, cause the one or more processors to: receive a plurality of images forming an image sequence; determine pose vector data for two successive images of the image sequence; provide the image sequence and the pose vector data to a generative adversarial network (GAN), wherein the GAN is trained using temporal constraints to generate a depth map for each image of the image sequence; and generate a reconstructed image based on a depth map received from the GAN.

Example 14 is non-transitory computer-readable storage media as in Example 13, wherein each image of the plurality of images is a monocular image, and wherein the reconstructed image is a monocular image.

Example 15 is non-transitory computer-readable storage media as in any of Example 13-14, wherein the plurality of images is received from a monocular camera, and wherein determining the pose vector data comprises using visual simultaneous localization and mapping for incrementally calculating a map of an environment of the monocular camera.

Example 16 is non-transitory computer-readable storage media as in any of Example 13-15, wherein the monocular camera is attached to a moving apparatus and wherein each image of the plurality of images is captured at a unique position of the monocular camera.

Example 17 is non-transitory computer-readable storage media as in any of Example 13-16, wherein the instructions further cause the one or more processors to calculate a loss signal configured to provide an additional temporal constraint for training the GAN. Calculating the loss signal comprises: receiving two successive depth maps from the GAN corresponding to the two successive images of the image sequence; determining depth pose vector data for the two successive depth maps using visual simultaneous localization and mapping; and calculating a disparity between the depth pose vector data and the pose vector data, wherein the disparity provides the loss signal.

Example 18 is non-transitory computer-readable storage media as in any of Example 13-17, wherein the instructions further cause the one or more processors to provide the loss signal to the GAN to provide a geometric pose constraint for use by the GAN to promote consistency by the GAN in generating the depth map.

Example 19 is non-transitory computer-readable storage media as in any of Example 13-18, wherein the instructions further cause the one or more processors to determine a temporal constraint for training the GAN. Determining the temporal constraint comprises: receiving a plurality of stereo images forming a stereo image sequence, wherein each image of the stereo image sequence comprises an image pair having a right image and a left image; calculating stereo pose vector data based on the right image and the left image of the image pair; receiving a generated depth map from the GAN based on the stereo pose vector data and the left image of the image pair; calculating a reconstructed right image based on the generated depth map and the left image of the image pair; and calculating a disparity between the right image of the image pair and the reconstructed right image, wherein the disparity provides the temporal constraint for training the GAN.

Example 20 is non-transitory computer-readable storage media as in any of Example 13-19, wherein the instructions further cause the one or more processors to determine an additional temporal constraint for training the GAN. Determining the additional temporal constraint comprises: determining reconstructed stereo pose vector data based on the left image of the image pair and the reconstructed right image; and calculating a pose disparity between the pose vector data and the reconstructed stereo pose vector data, wherein the pose disparity provides the additional temporal constraint for training the GAN.

Example 21 is a system or device that includes means for implementing a method, system, or device as in any of Examples 1-20.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium, which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. The terms "modules" and "components" are used in the names of certain components to reflect their implementation independence in software, hardware, circuitry, sensors, or the like. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

Further, although specific implementations of the disclosure have been described and illustrated, the disclosure is not to be limited to the specific forms or arrangements of parts so described and illustrated. The scope of the disclosure is to be defined by the claims appended hereto, any future claims submitted here and in different applications, and their equivalents.

What is claimed is:

1. A method comprising:
receiving at least two successive stereo image pairs forming an image sequence;
processing the image sequence with stereo visual odometry to generate pose vector data;
providing the image sequence and the pose vector data to a generative adversarial network (GAN), wherein the GAN is trained using temporal constraints to generate a depth map for a stereo image pair of the image sequence; and
generating a reconstructed image based on the depth map and a first image of the stereo image pair, wherein the reconstructed image represents a second image of the stereo image pair.

2. The method of claim 1, wherein each image of the image sequence is a monocular image, and wherein the reconstructed image is a monocular image.

3. The method of claim 2, wherein each stereo image pair of the image sequence is received from a stereo pair of monocular cameras, and wherein determining the pose vector data comprises using visual simultaneous localization and mapping for incrementally calculating a map of an environment of the stereo pair of monocular cameras.

4. The method of claim 3, wherein each monocular camera of the stereo pair of monocular cameras is attached to a moving apparatus and wherein each image of the at least two successive stereo image pairs is captured at a unique position.

5. The method of claim 1, further comprising calculating a loss signal configured to provide an additional temporal constraint for training the GAN, wherein calculating the loss signal comprises:

receiving two successive depth maps from the GAN corresponding to the at least two successive stereo image pairs of the image sequence;

determining depth pose vector data for the two successive depth maps using visual simultaneous localization and mapping; and calculating a disparity between the depth pose vector data and the pose vector data, wherein the disparity provides the loss signal.

6. The method of claim 5, further comprising providing the loss signal to the GAN to provide a geometric pose constraint for use by the GAN to promote consistency by the GAN in generating the depth map.

7. The method of claim 1, further comprising determining a temporal constraint for training the GAN, wherein determining the temporal constraint comprises:

receiving a plurality of stereo image pairs forming a stereo image sequence, wherein each stereo image pair of the stereo image sequence comprises an image pair having a right image and a left image;

calculating stereo pose vector data based on the right image and the left image of each of the plurality of stereo image pairs;

receiving a generated depth map from the GAN for each of the plurality of stereo image pairs based on the stereo pose vector data and the left image of each of the plurality of stereo image pairs;

calculating a reconstructed right image for each of the plurality of stereo image pairs based on the generated depth map and the left image for each of the stereo image pairs; and calculating a disparity between the right image and the reconstructed right image for each of the plurality of stereo image pairs, wherein the disparity provides the temporal constraint for training the GAN.

8. The method of claim 7, further comprising determining an additional temporal constraint for training the GAN, wherein determining the additional temporal constraint comprises:

determining reconstructed stereo pose vector data based on the left image and the reconstructed right image for each of the plurality of stereo image pairs; and calculating a pose disparity between the pose vector data and the reconstructed stereo pose vector data, wherein the pose disparity provides the additional temporal constraint for training the GAN.

9. The method of claim 8, wherein the stereo pose vector data and the reconstructed stereo pose vector data are calculated using stereo visual odometry.

10. The method of claim 1, wherein the image sequence comprises six images and the pose vector data comprises six Degree of Freedom pose information for each image of the six images, wherein the six Degree of Freedom pose information indicates relative poses of a monocular camera when each image was captured.

11. The method of claim 1, wherein the GAN is configured to generate a single depth map based on a single stereo image pair at a time, and wherein the temporal constraints are derived using stereo visual odometry and train the GAN to enforce temporal continuity in the quality of a plurality of depth maps generated by the GAN.

12. The method of claim 1, wherein each image of the image sequence is received from a monocular camera attached to a vehicle, and wherein the GAN is in communication with a vehicle controller.

13. Non-transitory computer-readable storage media storing instructions for execution by one or more processors, the instructions comprising:

receiving at least two successive stereo image pairs forming an image sequence;

processing the image sequence with stereo visual odometry to generate pose vector data;

providing the image sequence and the pose vector data to a generative adversarial network (GAN), wherein the GAN is trained using temporal constraints to generate a depth map for a stereo image pair of the image sequence; and generating a reconstructed image based on the depth map and a first image of the stereo image pair, wherein the reconstructed image represents a second image of the stereo image pair.

14. The non-transitory computer-readable storage media of claim 13, wherein each image of the image sequence is a monocular image, and wherein the reconstructed image is a monocular image.

15. The non-transitory computer-readable storage media of claim 13, wherein each stereo image pair of the image sequence is received from a stereo pair of monocular cameras, and wherein determining the pose vector data comprises using visual simultaneous localization and mapping for incrementally calculating a map of an environment of the stereo pair of monocular cameras.

16. The non-transitory computer-readable storage media of claim 15, wherein each monocular camera of the stereo pair of monocular cameras is attached to a moving apparatus and wherein each image of the at least two successive stereo image pairs is captured at a unique position.

17. The non-transitory computer-readable storage media of claim 13, wherein the instructions further comprise calculating a loss signal configured to provide an additional temporal constraint for training the GAN, wherein calculating the loss signal comprises:

receiving two successive depth maps from the GAN corresponding to the at least two successive stereo image pairs of the image sequence;

determining depth pose vector data for the two successive depth maps using visual simultaneous localization and mapping; and calculating a disparity between the depth pose vector data and the pose vector data, wherein the disparity provides the loss signal.

18. The non-transitory computer-readable storage media of claim 17, wherein the instructions further comprise providing the loss signal to the GAN to provide a geometric pose constraint for use by the GAN to promote consistency by the GAN in generating the depth map.

19. The non-transitory computer-readable storage media of claim 13, wherein the instructions further comprise determining a temporal constraint for training the GAN, wherein determining the temporal constraint comprises:

receiving a plurality of stereo image pairs forming a stereo image sequence, wherein each stereo image pair of the stereo image sequence comprises an image pair having a right image and a left image;

calculating stereo pose vector data based on the right image and the left image of each of the plurality of stereo image pairs;

receiving a generated depth map from the GAN for each of the plurality of stereo image pairs based on the stereo pose vector data and the left image of each of the plurality of stereo image pairs;

calculating a reconstructed right image for each of the plurality of stereo image pairs based on the generated depth map and the left image for each of the stereo image pairs; and calculating a disparity between the right image and the reconstructed right image for each of the plurality of stereo image pairs, wherein the disparity provides the temporal constraint for training the GAN.

20. The non-transitory computer-readable storage media of claim 19, wherein the instructions further comprise determining an additional temporal constraint for training the GAN, wherein determining the additional temporal constraint comprises:

determining reconstructed stereo pose vector data based on the left image and the reconstructed right image for each of the plurality of stereo image pairs; and calculating a pose disparity between the pose vector data and the reconstructed stereo pose vector data, wherein the pose disparity provides the additional temporal constraint for training the GAN.

* * * * *